US012241385B2

(12) United States Patent
Campbell et al.

(10) Patent No.: US 12,241,385 B2
(45) Date of Patent: Mar. 4, 2025

(54) WISHBONE FIBER LAYUP STRUCTURE FOR AIRFOIL

(71) Applicant: RAYTHEON TECHNOLOGIES CORPORATION, Farmington, CT (US)

(72) Inventors: Christian X. Campbell, West Hartford, CT (US); Aaron Tomich, Sutton, MA (US); Peter J. Rosenfeld, Westport, MA (US)

(73) Assignee: RTX CORPORATION, Farmington, CT (US)

( * ) Notice: Subject to any disclaimer, the term of this patent is extended or adjusted under 35 U.S.C. 154(b) by 10 days.

(21) Appl. No.: 18/353,196

(22) Filed: Jul. 17, 2023

(65) Prior Publication Data

US 2025/0027418 A1 Jan. 23, 2025

(51) Int. Cl.
*F01D 5/28* (2006.01)
*C04B 35/80* (2006.01)
(Continued)

(52) U.S. Cl.
CPC .............. *F01D 5/28* (2013.01); *C04B 35/80* (2013.01); *D03D 1/00* (2013.01); *D03D 3/00* (2013.01);
(Continued)

(58) Field of Classification Search
CPC .......... F01D 5/147; F01D 5/282; F01D 5/284; C04B 35/80; C04B 2235/3826;
(Continued)

(56) References Cited

U.S. PATENT DOCUMENTS 4,850,607 A * 7/1989 Trimble ................ B29C 70/342
280/281.1
7,241,112 B2 7/2007 Dambrine et al.
(Continued)

FOREIGN PATENT DOCUMENTS

EP 3292991 5/2020
EP 4030037 A1 7/2022
(Continued)

OTHER PUBLICATIONS

Vedula, V., Shi, J., Jarmon, D., Ochs, S., Oni, L., Lawton, T., Green, K., Prill, L., Schaff, J., and Linsey, G. (2005). Ceramic matrix composite turbine vanes for gas turbine engines. Proceedings of ASME Turbo Expo 2005: Power for Land, Sea, and Air. Jun. 6-9, 2005. pp. 1-5.
(Continued)

*Primary Examiner* — Courtney D Heinle
*Assistant Examiner* — Ryan C Clark
(74) *Attorney, Agent, or Firm* — Carlson, Gaskey & Olds, P.C.

(57) ABSTRACT

An airfoil wall that includes a wishbone-shaped fiber layup structure that has first and second arms that merge into a single leg. The leg includes fiber tows from each of the arms and the tows are interwoven in the leg. Each of the arms includes a first section that is distal from the leg and a second section that is proximal to the leg. The first section defines a first thickness and a first fiber tow count. The second section defines a second thickness that is greater than the first thickness and a second fiber tow count that is greater than the first fiber tow count. The single leg defines a third thickness that is greater than the second thickness and a third fiber tow count that is greater than the second fiber tow count.

19 Claims, 7 Drawing Sheets

(51) Int. Cl.
*D03D 1/00* (2006.01)
*D03D 3/00* (2006.01)
*D03D 25/00* (2006.01)

(52) U.S. Cl.
CPC .......... *D03D 25/005* (2013.01); *F01D 5/282* (2013.01); *C04B 2235/3826* (2013.01); *C04B 2235/3873* (2013.01); *C04B 2235/5244* (2013.01); *C04B 2235/5256* (2013.01); *D10B 2505/02* (2013.01); *F05D 2300/6012* (2013.01)

(58) Field of Classification Search
CPC .... C04B 2235/3873; C04B 2235/5244; C04B 2235/5256; F05D 2230/304; F05D 2300/6033; F05D 2300/6034; D10B 2505/02
See application file for complete search history.

(56) References Cited

U.S. PATENT DOCUMENTS

| | | | |
|---|---|---|---|
| 8,696,319 B2 | 4/2014 | Naik | |
| 9,033,673 B2* | 5/2015 | Roussille | F01D 5/282 |
| | | | 416/229 A |
| 9,045,992 B2* | 6/2015 | Roussille | F01D 5/225 |
| 9,062,562 B2* | 6/2015 | Coupe | F01D 5/282 |
| 9,605,543 B2 | 3/2017 | Nunez--et al. | |
| 9,664,053 B2 | 5/2017 | Marshall et al. | |
| 10,569,481 B2* | 2/2020 | Gallier | B29D 99/0028 |
| 10,767,502 B2* | 9/2020 | Schetzel | F01D 5/282 |
| 10,995,431 B2 | 5/2021 | Lefebvre et al. | |
| 11,261,547 B2 | 3/2022 | Lefebvre et al. | |
| 11,346,228 B1 | 5/2022 | Burdette et al. | |
| 11,920,495 B1* | 3/2024 | Campbell | F01D 5/188 |
| 2013/0011271 A1 | 1/2013 | Shi et al. | |
| 2013/0089429 A1* | 4/2013 | Nunez | C04B 35/571 |
| | | | 29/889.71 |
| 2014/0030076 A1* | 1/2014 | Nunez | C04B 35/571 |
| | | | 29/889.7 |
| 2014/0272246 A1* | 9/2014 | Lazur | B32B 5/08 |
| | | | 428/58 |
| 2014/0363303 A1* | 12/2014 | Roth-Johnson | F03D 1/0675 |
| | | | 29/889.7 |
| 2015/0226071 A1* | 8/2015 | Marshall | B32B 18/00 |
| | | | 416/241 B |
| 2016/0273372 A1* | 9/2016 | Podgorski | B29C 70/546 |
| 2018/0128112 A1* | 5/2018 | Amat | B64C 11/26 |
| 2018/0363475 A1 | 12/2018 | De Diego et al. | |
| 2019/0084892 A1* | 3/2019 | Subramanian | C04B 35/62844 |
| 2021/0032995 A1 | 2/2021 | Razzell et al. | |
| 2022/0090505 A1 | 3/2022 | Farmer et al. | |
| 2022/0228496 A1* | 7/2022 | Banhos | F01D 9/041 |
| 2023/0340883 A1* | 10/2023 | Roussille | B29B 11/16 |

FOREIGN PATENT DOCUMENTS

| | | |
|---|---|---|
| EP | 4047185 A1 | 8/2022 |
| EP | 3911841 B1 | 3/2023 |
| EP | 4403746 A1 | 7/2024 |
| WO | 2022112678 | 6/2022 |

OTHER PUBLICATIONS

Perea, Y., Muwanwella, R., Fernando, P., Fernando, S., and Jayawardana, T. (2021). Evolution of 3D weaving and 3D woven fabric structures. Fashion and Textiles. vol. 8 (11). 2021. pp. 1-31.
European Search Report for European Patent Application No. 24188460.0 mailed Nov. 18, 2024.

* cited by examiner

WISHBONE FIBER LAYUP STRUCTURE FOR AIRFOIL

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

An airfoil according to an example of the preset disclosure includes an airfoil wall that circumscribes a cavity and defines a leading edge, a trailing edge, and pressure and suction sides that join the leading edge and the trailing edge. The airfoil wall includes a wishbone-shaped fiber layup structure. The wishbone-shaped fiber layup structure has first and second arms that merge into a single leg. The first and second arms are comprised of a network of fiber tows. The single leg has fiber tows from each of the first and second arms that are interwoven. The single leg forms at least a portion of the trailing edge of the airfoil wall. Each of the first and second arms include a first section that is distal from the single leg and a second section that is proximal to the single leg. The first section defines a first thickness and a first fiber tow count. The second section defines a second thickness that is greater than the first thickness and a second fiber tow count that is greater than the first fiber tow count. The single leg defines a third thickness that is greater than the second thickness and a third fiber tow count that is greater than the second fiber tow count.

In a further embodiment of the foregoing embodiment, the first section, the second section, and the single leg each have a weave pattern, and the weave pattern of one of the first section, the second section, or the single leg is different than the weave pattern of another one of the first section, the second section, or the single leg.

In a further embodiment of any of the foregoing embodiments, the weave pattern of the first section is selected from a 2-dimensional weave.

In a further embodiment of any of the foregoing embodiments, the weave pattern of at least one of the second section or the single leg is a 3-dimensional weave.

In a further embodiment of any of the foregoing embodiments, the first fiber tow count is equal to or less than 40 tows per inch.

In a further embodiment of any of the foregoing embodiments, the third fiber tow count is equal to or greater than 110 tows per inch.

In a further embodiment of any of the foregoing embodiments, the second fiber tow count is from 50 to 100 tows per inch.

In a further embodiment of any of the foregoing embodiments, the network of fiber tows comprises warp tows and weft tows, and the weft tows span the first section, the second section, and the single leg.

In a further embodiment of any of the foregoing embodiments, at least one of the weft tows is a double tow that includes two fiber tows that are coextensive with each other.

In a further embodiment of any of the foregoing embodiments, the at least one of the weft tows that is a double tow in the first arm and the at least one of the weft tows that is a double tow in the second arm converge in the single leg to form a quad tow.

In a further embodiment of any of the foregoing embodiments, at least one of the warp tows in the second section or at least one of the warp tows in the single leg is a double tow that includes two fiber tows that are coextensive with each other.

In a further embodiment of any of the foregoing embodiments, in the single leg, a portion of the warp tows are double tows that each include two fiber tows that are coextensive with each other, and another portion of the warp tows are single tows.

In a further embodiment of any of the foregoing embodiments, all of the warp tows are single tows and all of the weft tows are double tows.

A gas turbine engine according to an example of the present disclosure includes a compressor section, a combustor in fluid communication with the compressor section, and a turbine section in fluid communication with the combustor. The turbine section has airfoils according to any of the foregoing embodiments.

A woven fabric according to an example of the present disclosure includes a wishbone-shaped fiber layup structure that has first and second arms that merge into a single leg. The first and second arms are comprised of a network of fiber tows. The single leg includes fiber tows from each of the first and second arms that are interwoven. The single leg forms at least a portion of the trailing edge of the airfoil wall. Each of the first and second arms include a first section that is distal from the single leg and a second section that is proximal to the single leg. The first section defines a first thickness and a first fiber tow count. The second section defines a second thickness that is greater than the first thickness and a second fiber tow count that is greater than the first fiber tow count. The single leg defines a third thickness that is greater than the second thickness and a third fiber tow count that is greater than the second fiber tow count.

In a further embodiment of any of the foregoing embodiments, the first section, the second section, and the single leg each have a weave pattern, the weave pattern of one of the first section, the second section, or the single leg is different than the weave pattern of another one of the first section, the second section, or the single leg, the weave pattern of the first section is selected from a 2-dimensional weave, and the weave pattern of at least one of the second section or the single leg is a 3-dimensional weave.

In a further embodiment of any of the foregoing embodiments, the first fiber tow count is equal to or less than 40 tows per inch, the third fiber tow count is equal to or greater than 110 tows per inch, and the second fiber tow count is from 50 to 100 tows per inch.

In a further embodiment of any of the foregoing embodiments, the network of fiber tows comprises warp tows and weft tows, and the weft tows span the first section, the second section, and the single leg, at least one of the weft tows is a double tow that includes two fiber tows that are coextensive with each other, and at least one of the warp tows in the second section or at least one of the warp tows in the single leg is a double tow that includes two fiber tows that are coextensive with each other.

In a further embodiment of any of the foregoing embodiments, in the single leg, a portion of the warp tows are double tows and another portion of the warp tows are single tows.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 6B illustrates another example fiber tow layup configuration in which the weft tows turn back in the second section 72b of the arms 66a.

In this disclosure, like reference numerals designate like elements where appropriate and reference numerals with the addition of one-hundred or multiples thereof designate modified elements that are understood to incorporate the same features and benefits of the corresponding elements.

DETAILED DESCRIPTION

Figure 1:
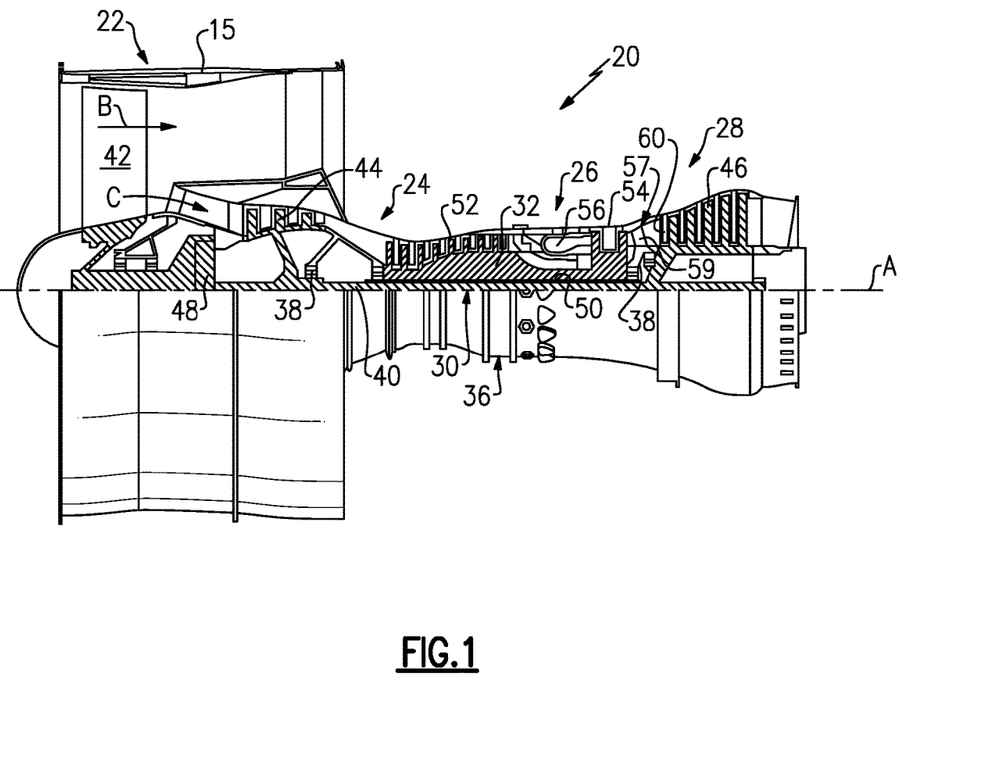
FIG. 1 illustrates an example of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
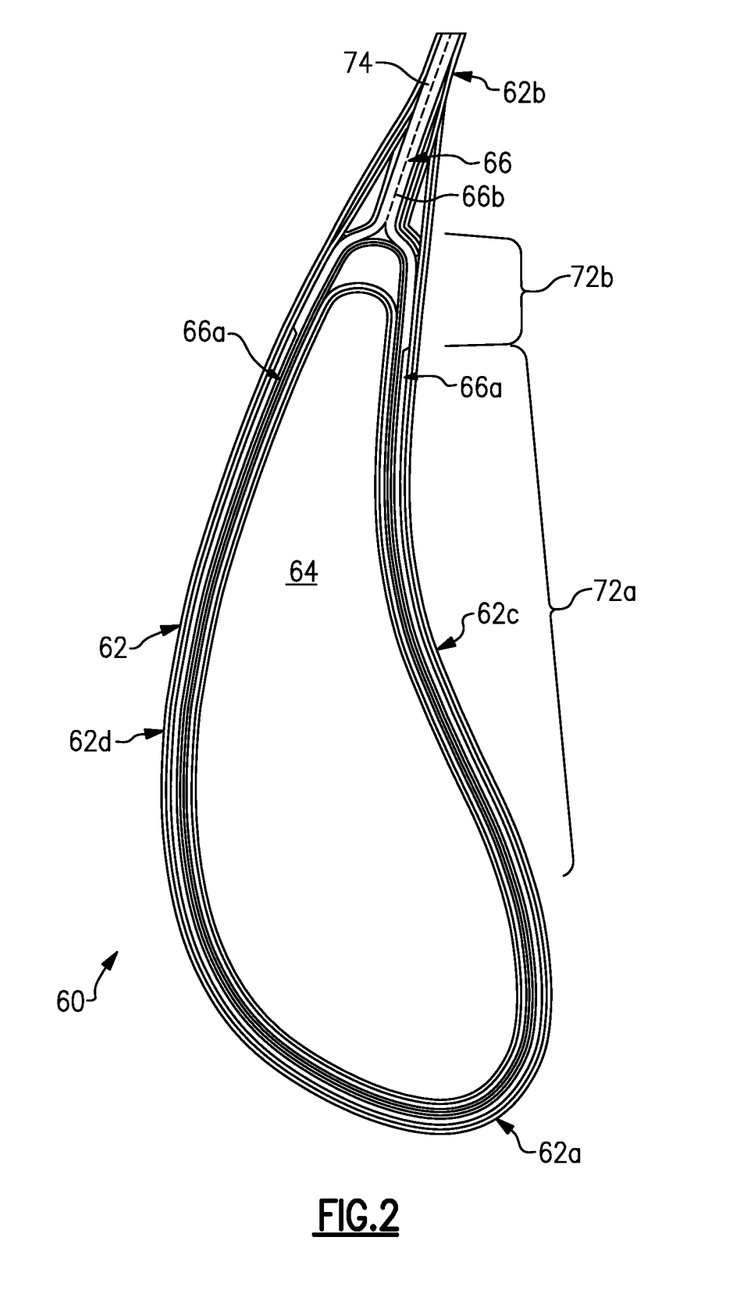
FIG. 2 illustrates a sectioned view of an example airfoil from the engine.

FIG. 2 illustrates a sectioned view of an example airfoil 60 from the turbine section 28 of the engine 20 (see also FIG. 1). For example, the airfoil 60 may be a blade or a vane. It is to be understood that although the examples herein are discussed in context of a turbine airfoil, the examples can also be applied to airfoils in other sections of the engine 20.

The aerodynamic profile of the airfoil 60 is formed by an airfoil wall 62. In this regard, the airfoil wall 62 defines a leading edge 62a, a trailing edge 62b, a pressure side 62c, and a suction side 62d of the airfoil 60. The airfoil wall 62 circumscribes an interior cavity 64, to which cooling air (e.g., from the compressor section 24) may be provided. One or more ribs may be provided across the cavity 64 to partition it into two or more sub-cavities.

The airfoil wall 62 is formed of a ceramic matrix composite (CMC). A CMC material is comprised of one or more ceramic fiber plies in a ceramic matrix. Example ceramic matrices are silicon-containing ceramic, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SiC) fiber or silicon nitride (Si3N4) fibers. The CMC may be, but is not limited to, a SiC/SiC ceramic matrix composite in which SiC fiber plies are disposed within a SiC matrix. The ceramic fibers are provided in tows that are in an ordered arrangement in fiber plies or layers.

Figure 3:
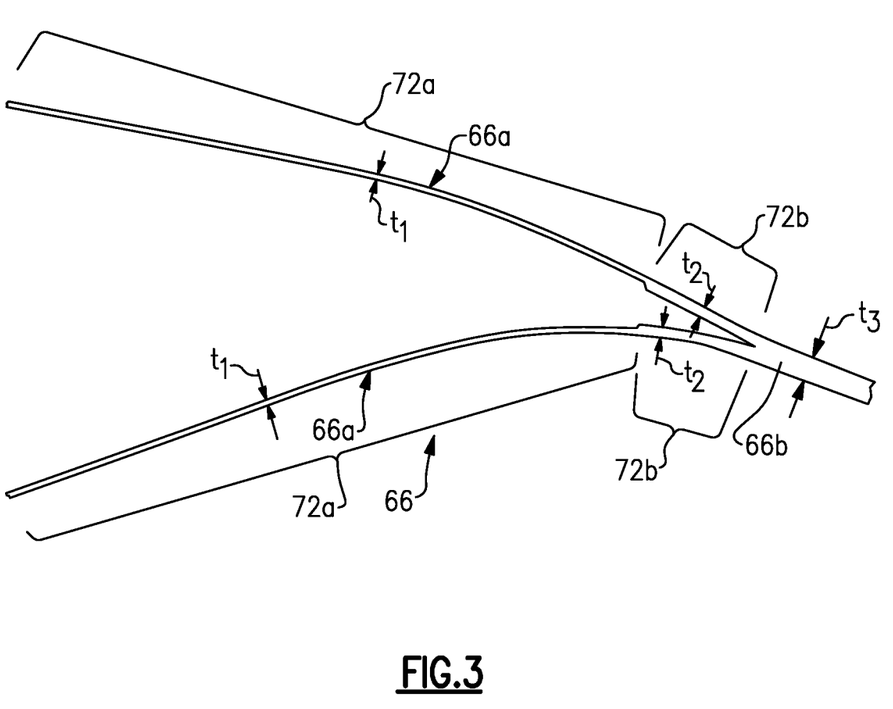
FIG. 3 illustrates a wishbone-shaped fiber layup structure.

The airfoil wall 62 includes a wishbone-shaped fiber layup structure 66, which is also shown in an isolated, sectioned view (taken along a plane that includes the engine axis A) in FIG. 3. The term "wishbone-shaped" refers to the resemblance of the structure 66 to a wishbone that has a leg and two arms that extend from an end of the leg to form a "V." Here, the structure 66 includes a pair of arms 66a that merge into a single leg 66b.

Each of the first and second arms 66a include a first section 72a that is distal from the single leg 66b and a second section 72b that is proximal to the single leg 66b. The first section 72a defines a first thickness (t1) and the second section 72b defines a second thickness (t2) that is greater than the first thickness (t1). The single leg 66b defines a third thickness (t3) that is greater than the second thickness (t2).

In a wishbone fiber structure in which the arms simply merge into a single leg, the leg may nominally be of equal or lower thickness than the sum of the thickness of the arms. While mechanically strong, this thickness of the single leg may not be desirable in some designs, particularly where cooling holes are to be drilled through the trailing edge to the internal cavity. For instance, the diameter of the cooling hole may exceed or approach the thickness of the single leg and thus require an undesirable condition in which the cooling hole has to be drilled along an interlaminar interface between the single leg and an adjacent fiber layer.

In the structure 66, however, the arms 66a increase in thickness from the first section 72a to the second section 72b. Thus, when the second sections 72b merge, a thicker single leg 66b is formed. The increased thickness of the second sections 72b in comparison to the first sections 72a allows for more tows to interconnect in the single leg 66b, thereby enhancing strength and toughness in the trailing edge 62b and preventing delamination. Such a configuration further permits the first sections 72a to be relatively thin so that they remain pliable and can be conformed to a desirable design geometry of the airfoil 60. Accordingly, the structure 66 provides a thicker single leg 66b without having to make the arms 66a so thick that they lose pliability. The thickness also facilitates containment of drilled cooling holes, thereby reducing the chances of causing delamination. The stiffness of the thick single leg 66b may also facilitate maintaining the shape of the trailing edge during the preforming process. The structure 66 may also facilitate reducing disparities at the free surfaces in the tip of the trailing edge 62b. For instance, a starting fabric may have discontinuities at its edges, where fibers are misaligned or unraveled. If such discontinuities are ultimately located at the tip of the trailing edge, the properties of the tip region may be debited. However, with the structure 66, the single leg 66b can initially be over-sized in length and then machined down to the required design length. Such use of the excess sacrificial length of the single leg 66b means that the tip of the trailing edge 62b corresponds to a central portion of the fabric instead of a free edge.

In one example, the third thickness (t3) is greater than the first thickness (t1) by a factor of at least 3, such as by a factor of 3.2-4.8. In a further example, the second thickness (t2) is greater than the first thickness (t1) by a factor of at least 1.5, such as by a factor of 1.6-2.4. In the above examples, the first thickness (t1) may be from approximately 0.005 to 0.015 inches.

Figure 4:
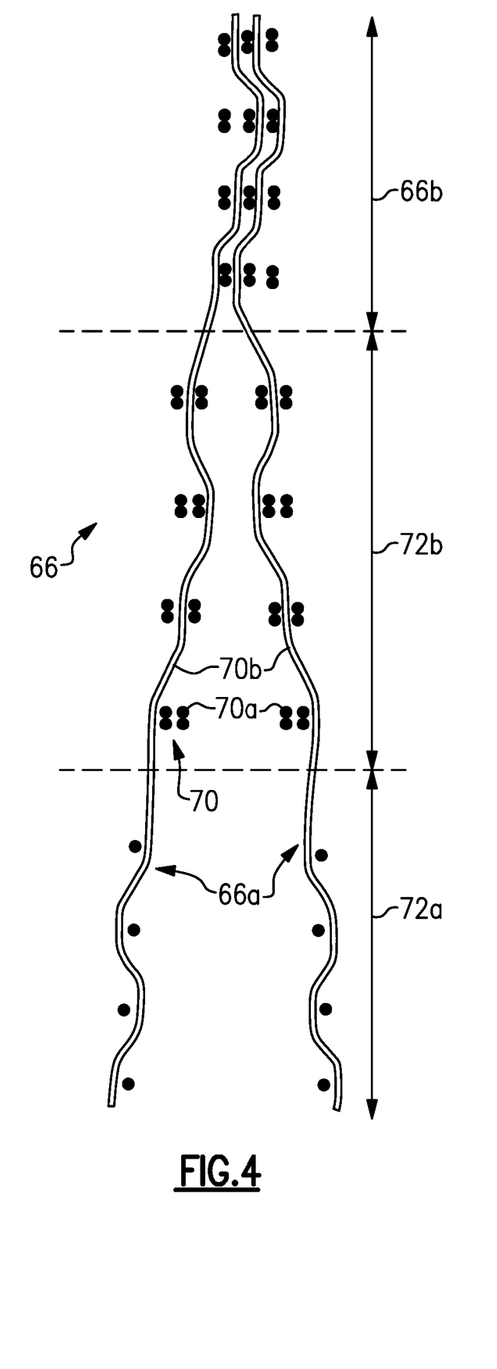
FIG. 4 illustrates a fiber tow layup configuration of a wishbone-shaped fiber layup structure.

FIG. 4 shows an example of a fiber tow layup configuration of the structure 66. The arms 66a are comprised of a network (e.g., a weave) of fiber tows 70, including warp tows 70a and weft tows 70b). The weft tows 70b span the first section 72a, the second section 72b, and the single leg 66b such that the tows 70b from each of the arms 66a are interwoven in the single leg 66b. Thus, once merged, the arms 66a cease to be distinct from each other and there are no interlaminar interfaces. As will be appreciated, the views in FIG. 4 and in subsequent figures that depict fiber tow layup configurations are representations in one plane. It is to be understood that the configurations will continue into and out of the plane, but that at any given plane the weave phase may differ. For instance, the weft tow 70b of the arm 66a on the left side in FIG. 4 extends around the left side of the first (lowest) warp tow 70a column, splits the next warp tow 70a column, extends around to the right of the next warp tow 70a column, and then splits the fourth (top) warp tow 70a column (i.e. left/split/right/split). In the next weft tow 70*b* into the page, this phase is shifted such that the weft tow 70*b* is split/right/split/left. The next weft tow 70*b* after that is shifted and would be right/split/left/split, and the next weft tow 70*b* into the page after that would be split/left/split/right. Each depicted configuration throughout the figures shifts in this manner.

The numbers of fibers and the weave pattern are manipulated to step-up the thickness from the thin first section 72*a* to the thicker second section 72*b* and from the second section 72*b* to the single leg 66*b*, and the thicknesses can be tailored to meet strength or other requirements. For example, the first section 72*a* defines a first fiber tow count, the second section 72*b* defines a second fiber tow count that is greater than the first fiber tow count, and the single leg 66*b* defines a third fiber tow count that is greater than the second fiber tow count.

The tows 70*a* and/or 70*b* can be provided as double tows to further control fiber tow count, and thus thickness. A "double tow" as used herein refers to two tows that are coextensive with each other (continuously side-by-side) over a majority of their lengths in one of the first section 72*a*, the second section 72*b*, or the single leg 66*b*. For example, a single tow of 1800 denier would yield a double tow of 3600 denier. In the example of FIG. 4, all of the warp tows 70*a* in the second section 72*b* and in the single leg 66*b* are double tows. The double tows add to the fiber tow count and thus increase the thickness in comparison to the use of only single tows. The spacing between the columns of warp tows 70*a* may also be adjusted to tailor fiber tow count and thus thickness. For example, the spacing between the columns of warp tows 70*a* in the single leg 66*b* is less than the spacing between the warp tow 70*a* columns in the second section 72*b*. The tighter spacing in the leg 66*b* facilitates increasing the fiber tow count and thus the thickness.

A "fiber tow count" as used herein refers to the sum of the number of warp tows 70*a* per inch and the number of weft tows 70*b* per inch. For instance, the first fiber tow count is equal to or less than 40 tows per inch, the third fiber tow count is equal to or greater than 110 tows per inch, and the second fiber tow count is from 50 to 100 tows per inch. In the illustrated example in FIG. 4, the first fiber tow count is 32 tows per inch, the third fiber tow count is 128 tows per inch, and the second fiber tow count is 64 tows per inch.

In addition to the fiber tow counts, the weave patterns of each of the first section 72*a*, the second section 72*b*, and the single leg 66*b* contribute to control over the thicknesses. For instance, the weave pattern of one of the first section 72*a*, the second section 72*b*, or the single leg 66*b* is different than the weave pattern of another one of the first section 72*a*, the second section 72*b*, or the single leg 66*b*. In the example illustrated in FIG. 4, the weave pattern of the first section 72*a* is selected from a 2-dimensional weave, such as a plain weave or a harness satin weave. These weave patterns are relatively loose and thus permit the first section 72*a* to maintain pliability. The weave pattern of at least one of the second section 72*b* or the single leg 66*b* is a 3-dimensional weave, such as an angle interlock weave (e.g., the modified layer-to-layer weave depicted in the illustrated example). The weave patterns of the first section 72*a* and of the single leg 66*b* can be repeated to lengthen those sections.

Figure 5:
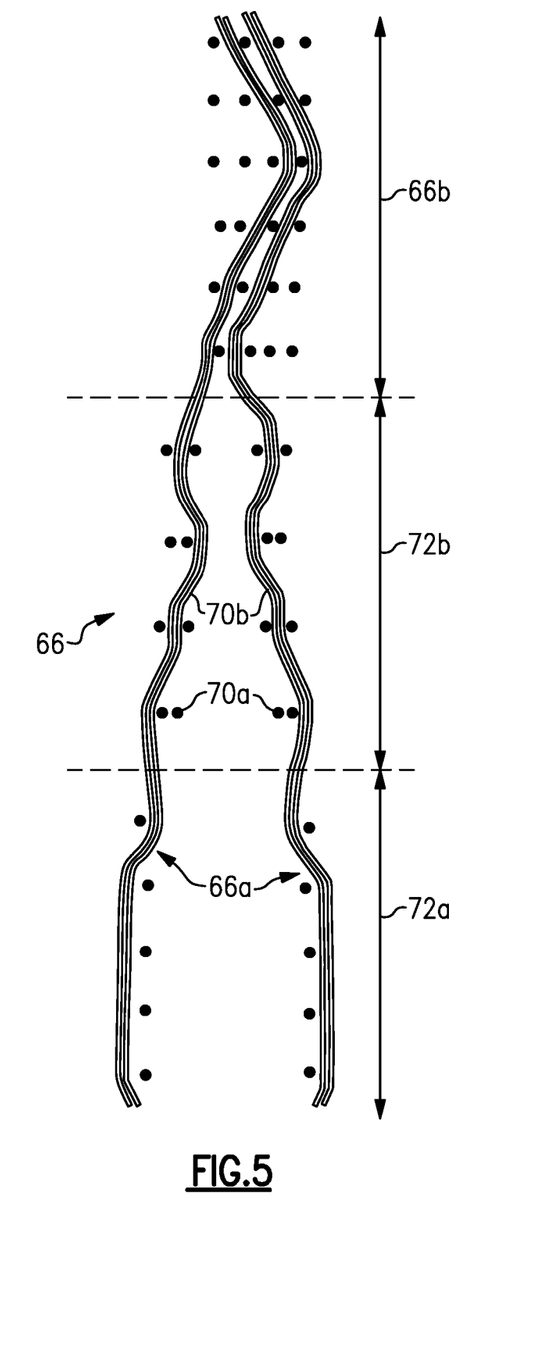
FIG. 5 illustrates another example fiber tow layup configuration of a wishbone-shaped fiber layup structure.

FIG. 5 illustrates another example fiber tow configuration for the structure 66. In this example, the first fiber tow count is 40 tows per inch, the third fiber tow count is 128 tows per inch, and the second fiber tow count is 64 tows per inch. The first section 72*a* is a harness satin weave, and the second section 72*b* and the single leg 66*b* are modified layer-to-layer weaves. The weft tows 70*b* are double tows, and all of the warp tows 70*b* in the single leg 66*b* are single tows. However, to maintain thickness, although the warp tows 70*a* in the single leg 66*b* are single tows, each column of warp tows 70*a* has an additional tow in the column height in comparison to the columns in the configuration of FIG. 4. The double weft tows 70*b* provide additional strength to facilitate resistance of the single leg 66*b* to splitting.

Figures 6A, 7, 8:
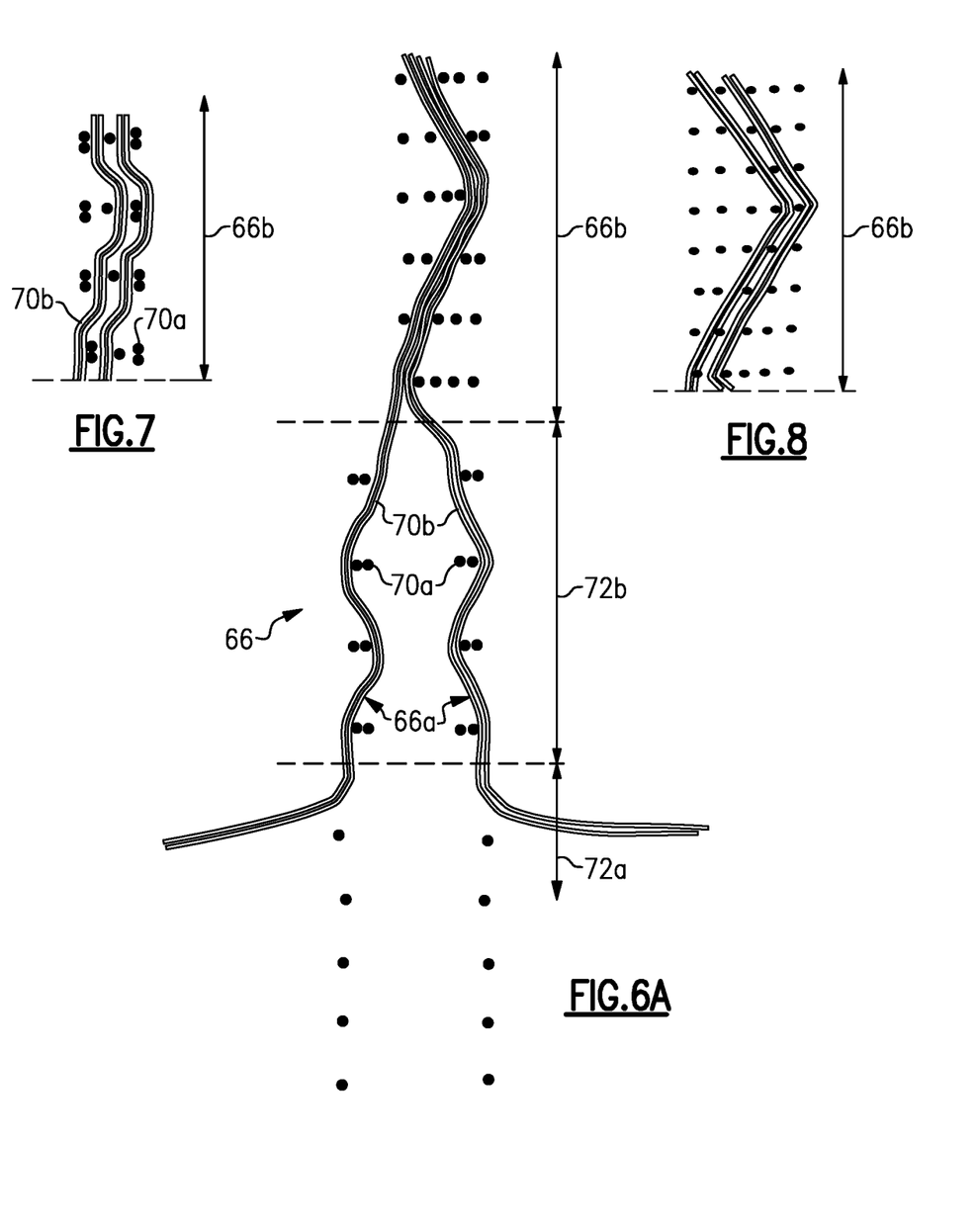
FIG. 6A illustrates another example fiber tow layup configuration having an angle interlock weave.
FIG. 7 illustrates an additional example of fiber tow configuration for the single leg in which a portion of the warp tows in the single leg are double tows.
FIG. 8 illustrates an additional example of fiber tow configuration for the single leg in which there is an additional tow in the column height to increase the fiber tow count.
Figure 6B:
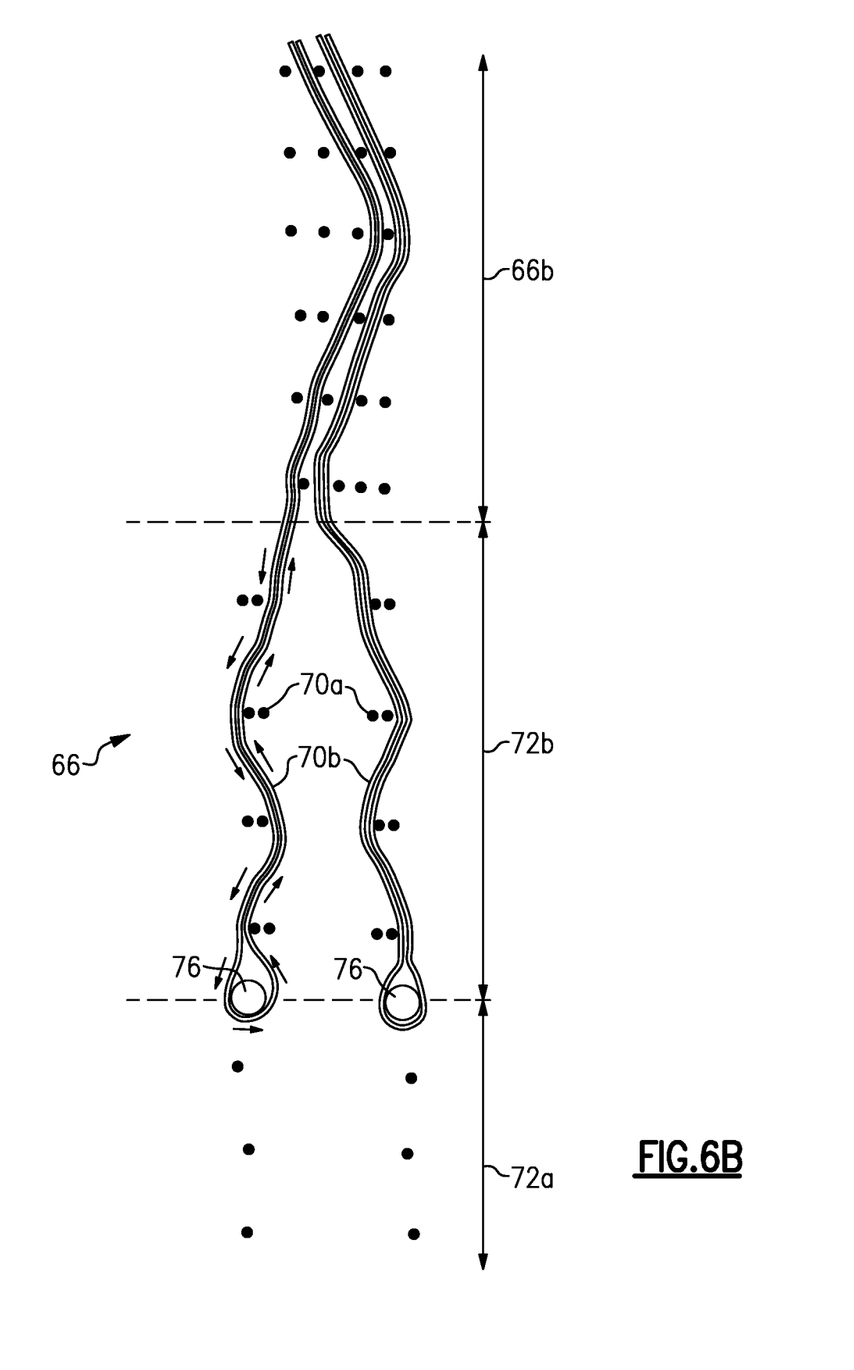

In a further example depicted in FIG. 6A, the second section 72*b* has a plain weave pattern and the single leg 66*b* has an angle interlock weave. The weft tows 70*b* are double tows. In the example in FIG. 5, the double weft tows 70*b* remain as double tows in the single leg 66*b*. However, in the configuration of FIG. 6, the double weft tows 70*b* from the arms 66*a* converge in the single leg to form a quad tow, i.e., four tows that are coextensive with each other (continuously side-by-side) over a majority of their lengths in the single leg 66*b*. In a further option also shown in FIG. 6A, at least some of the weft tows 70*b* (e.g. every other weft tow 70*b*) in the first section 72*a* are left unwoven and then later removed. The removal (e.g., by cutting) lowers the fiber tow count (thereby lowering thickness) and thus serves for further tailoring the thickness and pliability of the first section 72*a*. As shown in FIG. 6B, rather than leaving some of the weft tows 70*b* unwoven and later removing them, the weft tows 70*b* in the second section 72*b* may be turned back instead of extending into the first section 72*a*. In this regard, thick threads 76 are provided in the warp direction. The weft tows 70*b* loop around the thick threads 76 and double back through the second section 72*b* and single leg 66*b*. The thick threads 76 may later be removed.

FIGS. 7 and 8 each illustrate additional examples of fiber tow configurations for the single leg 66*b*. The configuration in FIG. 7 is the same as the configuration of the single leg 66*b* in FIG. 4 except that instead of all double warp tows 70*a*, a portion of the warp tows 70*a* are double tows and another portion of the warp tows 70*a* are single tows. Using some single and some double tows lowers the fiber tow count (thereby lowering thickness) and thus serves as an additional option for tailoring the thickness of the single leg 66*b* (or alternatively the second section 72*b*).

The configuration in FIG. 8 is the same as the configuration of the single leg 66*b* in FIG. 5 except that the configuration in FIG. 8 includes five warp tows 70*a* per column (versus four warp tows 70*a* per column in FIG. 5). Using an additional tow in the column height increases the fiber tow count (thereby increasing thickness) and thus serves as an option for tailoring the thickness of the single leg 66*b* (or alternatively the second section 72*b*).

Figure 9:
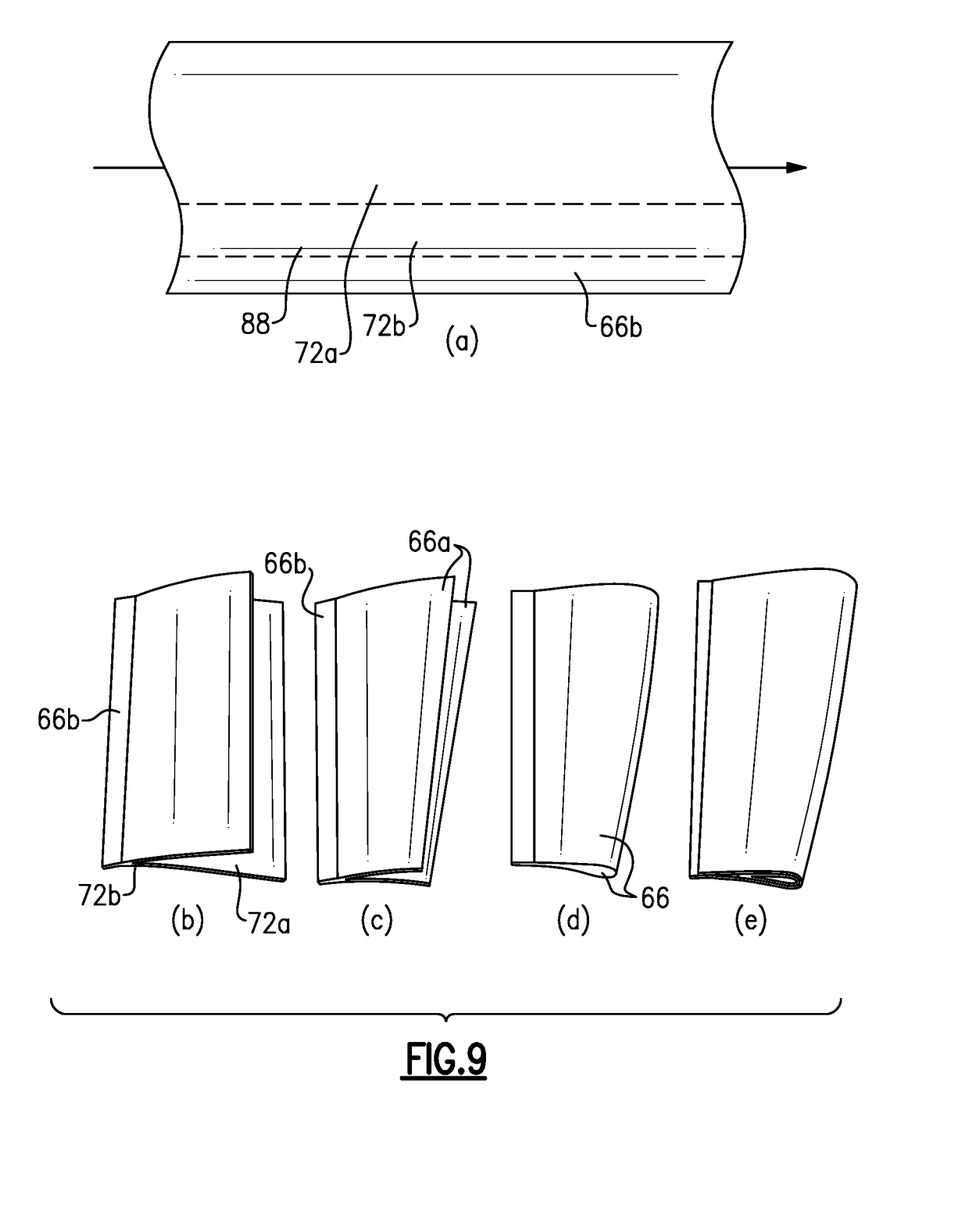
FIG. 9 demonstrates an example of fabricating the airfoil.

FIG. 9 demonstrates an example of fabricating the airfoil 60. At step (a), a fabric 88 is provided. The fabric 88 may be provided as a pre-made product or, if not pre-made, the fabric 88 may be made in a weaving process. The fabric 88 is woven in the warp direction such that the single leg 66*b* runs length-wise in the warp direction. At step (b), the fabric length is trimmed to the desired size of the airfoil 60 that is to be produced. For example, the fabric length corresponds to the radial span of the airfoil 60. At step (c), the arms 66*a* are trimmed to the desired geometry of the airfoil 60 that is to be produced. For example, the arms 66*a* are trimmed at an angle such that the chord of the airfoil either increases or decreases over the radial span. At step (d), the arms 66*a* are wrapped to form the geometry of the airfoil 60. For instance, the arms 66*a* may be wrapped around a mandrel to form the desired shape. At step (e), the additional fiber plies may be applied to build-up features around the structure 66, followed by densification to add a fiber interface coating and the matrix material. Afterwards, one or more post-processing steps may be conducted, depending on the airfoil design. For instance, the single leg 66b may initially be over-sized in the axial direction. In that case, the excess sacrificial length may be trimmed to produce the design geometry. Additionally or alternatively, cooling holes 74 (FIG. 2) may be drilled in the trailing edge 62b. For example, laser drilling may be used. In further examples, the trailing edge 62b may be further machined to tailor the geometry, such as with scallops or "scarfing" to round-off relatively sharp edges.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
    an airfoil wall circumscribing a cavity and defining a leading edge, a trailing edge, and pressure and suction sides that join the leading edge and the trailing edge, the airfoil wall including a wishbone-shaped fiber layup structure,
    the wishbone-shaped fiber layup structure including first and second arms that merge into a single leg,
    the first and second arms being comprised of a network of fiber tows,
    the single leg including fiber tows from each of the first and second arms that are interwoven, the single leg forming at least a portion of the trailing edge of the airfoil wall,
    each of the first and second arms including a first section that is distal from the single leg and a second section that is proximal to the single leg,
    the first section defining a first thickness and a first fiber tow count,
    the second section defining a second thickness that is greater than the first thickness and a second fiber tow count that is greater than the first fiber tow count, and
    the single leg defining a third thickness that is greater than the second thickness and a third fiber tow count that is greater than the second fiber tow count.

2. The airfoil as recited in claim 1, wherein the first section, the second section, and the single leg each have a weave pattern, and the weave pattern of one of the first section, the second section, or the single leg is different than the weave pattern of another one of the first section, the second section, or the single leg.

3. The airfoil as recited in claim 2, wherein the weave pattern of the first section is selected from a 2-dimensional weave.

4. The airfoil as recited in claim 3, wherein the weave pattern of at least one of the second section or the single leg is a 3-dimensional weave.

5. The airfoil as recited in claim 1, wherein the first fiber tow count is equal to or less than 40 tows per inch.

6. The airfoil as recited in claim 5, wherein the third fiber tow count is equal to or greater than 110 tows per inch.

7. The airfoil as recited in claim 6, wherein the second fiber tow count is from 50 to 100 tows per inch.

8. The airfoil as recited in claim 1, wherein the network of fiber tows comprises warp tows and weft tows, and the weft tows span the first section, the second section, and the single leg.

9. The airfoil as recited in claim 8, wherein at least one of the weft tows is a double tow that includes two fiber tows that are coextensive with each other.

10. The airfoil as recited in claim 9, wherein the at least one of the weft tows that is a double tow in the first arm and the at least one of the weft tows that is a double tow in the second arm converge in the single leg to form a quad tow.

11. The airfoil as recited in claim 8, wherein at least one of the warp tows in the second section or at least one of the warp tows in the single leg is a double tow that includes two fiber tows that are coextensive with each other.

12. The airfoil as recited in claim 8, wherein, in the single leg, a portion of the warp tows are double tows that each include two fiber tows that are coextensive with each other, and another portion of the warp tows are single tows.

13. The airfoil as recited in claim 8, wherein all of the warp tows are single tows and all of the weft tows are double tows.

14. A gas turbine engine comprising:
    a compressor section;
    a combustor in fluid communication with the compressor section; and
    a turbine section in fluid communication with the combustor, the turbine section having airfoils including:
        an airfoil wall circumscribing a cavity and defining a leading edge, a trailing edge, and pressure and suction sides that join the leading edge and the trailing edge, the airfoil wall including a wishbone-shaped fiber layup structure,
        the wishbone-shaped fiber layup structure including first and second arms that merge into a single leg,
        the first and second arms being comprised of a network of fiber tows,
        the single leg including fiber tows from each of the first and second arms that are interwoven, the single leg forming at least a portion of the trailing edge of the airfoil wall,
        each of the first and second arms including a first section that is distal from the single leg and a second section that is proximal to the single leg,
        the first section defining a first thickness and a first fiber tow count,
        the second section defining a second thickness that is greater than the first thickness and a second fiber tow count that is greater than the first fiber tow count, and
        the single leg defining a third thickness that is greater than the second thickness and a third fiber tow count that is greater than the second fiber tow count.

15. A woven fabric comprising:
    a wishbone-shaped fiber layup structure configured to form an airfoil, the wishbone-shaped fiber layup structure including first and second arms that merge into a single leg, the first and second arms for forming sides of the airfoil and the single leg for forming a trailing edge of the airfoil,
    the first and second arms being comprised of a network of fiber tows,
    the single leg including fiber tows from each of the first and second arms that are interwoven, the single leg forming at least a portion of the trailing edge of the airfoil wall, each of the first and second arms including a first section that is distal from the single leg and a second section that is proximal to the single leg, the first section defining a first thickness and a first fiber tow count, the second section defining a second thickness that is greater than the first thickness and a second fiber tow count that is greater than the first fiber tow count, and the single leg defining a third thickness that is greater than the second thickness and a third fiber tow count that is greater than the second fiber tow count.

16. The woven fabric as recited in claim 15, wherein the first section, the second section, and the single leg each have a weave pattern, the weave pattern of one of the first section, the second section, or the single leg is different than the weave pattern of another one of the first section, the second section, or the single leg, the weave pattern of the first section is selected from a 2-dimensional weave, and the weave pattern of at least one of the second section or the single leg is a 3-dimensional weave.

17. The woven fabric as recited in claim 15, wherein the first fiber tow count is equal to or less than 40 tows per inch, the third fiber tow count is equal to or greater than 110 tows per inch, and the second fiber tow count is from 50 to 100 tows per inch.

18. The woven fabric as recited in claim 15, wherein the network of fiber tows comprises warp tows and weft tows, and the weft tows span the first section, the second section, and the single leg, at least one of the weft tows is a double tow that includes two fiber tows that are coextensive with each other, and at least one of the warp tows in the second section or at least one of the warp tows in the single leg is a double tow that includes two fiber tows that are coextensive with each other.

19. The woven fabric as recited in claim 18, wherein, in the single leg, a portion of the warp tows are double tows and another portion of the warp tows are single tows.

* * * * *